(12) United States Patent
Gouvenot et al.

(10) Patent No.: US 6,447,599 B1
(45) Date of Patent: Sep. 10, 2002

(54) METHOD OF LIMITING THE RELEASE OF ORGANIC MATERIALS INTO THE ENVIRONMENT DURING THE MAKING OF FOUNDATIONS, AND CONCRETE WHICH CAN BE USED IN SAID METHOD

(75) Inventors: Daniel Gouvenot; Hubert Vattement, both of Nanterre (FR)

(73) Assignee: Compagnie du Sol, Nanterre (FR)

( * ) Notice: Subject to any disclaimer, the term of this patent is extended or adjusted under 35 U.S.C. 154(b) by 0 days.

(21) Appl. No.: 09/950,208

(22) Filed: Sep. 6, 2001

(30) Foreign Application Priority Data

Sep. 13, 2000 (FR) .............................. 00 11635

(51) Int. Cl.⁷ .............................................. C04B 07/14
(52) U.S. Cl. ...................... 106/789; 106/790; 106/791; 106/900; 405/267; 405/268; 52/294
(58) Field of Search ................................. 106/900, 789, 106/790, 791; 405/267, 268; 52/294

(56) References Cited

U.S. PATENT DOCUMENTS

| 5,309,999 A | * | 5/1994 | Cowan et al. | ............... 166/293 |
| 5,374,309 A | * | 12/1994 | Piniecki | ...................... 106/714 |
| 5,393,342 A | * | 2/1995 | Hooykaas | .................... 106/714 |

FOREIGN PATENT DOCUMENTS

| DE | 3610755 | * | 10/1987 |
| FR | 2655975 | * | 6/1991 |
| FR | 2 777 274 | | 10/1999 |
| JP | 04320488 | * | 11/1992 |
| JP | 9-255392 | | 9/1997 |
| JP | 2001040652 | * | 2/2001 |
| JP | 2001261465 | * | 9/2001 |
| WO | WO 99/67183 | | 12/1999 |

OTHER PUBLICATIONS

"Use of Granulated B F Slay as additions for concrete" Yoda et al. Askitaga Kogyo Daigahre (1994), 20, 199–205, 1994.*

* cited by examiner

*Primary Examiner*—Paul Marcantoni
(74) *Attorney, Agent, or Firm*—Merchant & Gould P.C.

(57) ABSTRACT

The present invention relates to a method of limiting the release of organic materials into the environment during the making of foundations, according to which a concrete is used which is based on blast furnace slag ground to a fineness of between about 2,500 and 5,000 Blaine.

The invention also relates to a concrete which can be used in said method.

33 Claims, No Drawings

METHOD OF LIMITING THE RELEASE OF ORGANIC MATERIALS INTO THE ENVIRONMENT DURING THE MAKING OF FOUNDATIONS, AND CONCRETE WHICH CAN BE USED IN SAID METHOD

The present invention relates to a method of limiting the release of organic materials into the environment during the making of foundations, as well as to a concrete which can be used in said method.

The invention finds its application notably in the field of construction and of building.

The cements which are traditionally used in concretes lead to materials the rheology of which is not adapted to the making of piles or walls moulded in the ground.

In order to adapt this rheology to foundation work, the user is forced to use significant amounts of additives. These significant amounts of organic materials are partly lixivated and are released into the environment mainly due to the effect of filtration during the period in which the concrete is still fluid.

Another drawback of these concretes is the modification of the pH around the area wherein they are placed. This rise in the pH is caused mainly by the dissolution of the lime contained in the binder.

The lixivation and the release of the organic materials, which are combined with the pH rise mentioned above, contribute to the disequilibrium of the oxygen balance of the ground waters.

The invention offers remedying these drawbacks by means of a concrete which enables the release of said organic materials into the environment to be limited.

Thus, according to a first aspect, the invention relates to a method of limiting the release of organic materials into the environment during the making of foundations, according to which a concrete is used which is based on blast furnace slag ground to a fineness of between about 2,500 and 5,000 Blaine ($cm^2/g$), preferably of between about 3,500 and 4,500 Blaine.

Although the nature of the blast furnace slag be not particularly critical, it is preferable that it be of basic-type and that the weight ratio $CaO/SiO_2$ be of between about 1.10 and 1.35. A material comprising 33 to 40% of $SiO_2$, 8 to 16% of $Al_2O_3$, 39 to 44% of CaO, and 4 to 9% of MgO as main components (in percentages by weight), can be cited as an example of slag which can be used in the context of the present invention.

Furthermore, it is also preferable that the chemical modulus of the lag (CaO content (%)×$Al_2O_3$ content (%)) be greater than about 500.

The blast furnace slag is advantageously activated by a basic agent. A lime-based compound, such as lime itself or hydrated lime (also known under the name of slaked lime) can be cited as an activating agent which can be used in the context of the invention. It is also possible to use a sulphate-based compound such as gypsum. A mixed compound (lime-based compound/sulphate-based compound) is also suitable; in this case, the lime-based compound/sulphate-based compound weight ratio is generally of between about 0.3 and 1.5. It is also possible to use a cement such as CLK CEM III/C cement or CPJ CEM II cement, for example, and this advantageously enables the activation to be made with very little lime.

In general, it is desirable to use an amount of activating agent of between about 2% and 15% by weight with respect to the weight of the blast furnace slag.

The concrete used in the method in accordance with the invention can also comprise a deflocculating agent and/or an anti-wringing agent. According to a preferred embodiment of the invention, the concrete comprises a deflocculating agent and an anti-wringing agent. <<An anti-wringing agent>> is understood in the sense of the present invention as meaning a compound which reduces the phenomenon of expulsion of the free water contained in the concrete when the latter is poured under pressure.

The deflocculating agent which can be used in the context of the invention is advantageously a phosphonate-type compound which is for example of the formulae:

$$R_3-N{\overset{\displaystyle CH_2R_1}{\underset{\displaystyle CH_2R_1}{}}} \quad \text{or} \quad (1)$$

$$R_5-\underset{\underset{\displaystyle R_6}{\displaystyle |}}{\overset{\overset{\displaystyle R_4}{\displaystyle |}}{C}}-\underset{\underset{\displaystyle OR_2}{\displaystyle |}}{\overset{\overset{\displaystyle OR_2}{\displaystyle |}}{P}}=O \quad (2)$$

in which:
$R_1$ represents a group of formula $$-\underset{\underset{\displaystyle OR_2}{\displaystyle |}}{\overset{\overset{\displaystyle OR_2}{\displaystyle |}}{P}}=O;$$

each $R_2$ independently represents hydrogen, a sodium atom or a potassium atom;
$R_3$ represents a $$-CH_2R_1, \quad -(CH_2)_{\overline{n}}-N{\overset{\displaystyle CH_2R_1}{\underset{\displaystyle CH_2R_1}{}}} \quad \text{or}$$

$$-(CH_2)_{\overline{n}}-\underset{\underset{\displaystyle CH_2R_1}{\displaystyle |}}{N}-(CH_2)_{\overline{n}}-N{\overset{\displaystyle CH_2R_1}{\underset{\displaystyle CH_2R_1}{}}} \quad \text{group;}$$

$R_4$, $R_5$ and $R_6$, independently of each other, represent a hydroxy, a ($C_1$–$C_4$)alkyl or an $R_1$ group;
each n is independently equal to 2, 3, 4, 5 or 6.
The following can notably be cited:
hydroxyethylidene-1,1-diphosphonic acid,
aminotrismethylenephosphonic acid,
ethylenediaminetetramethylenephosphonic acid,
diethylenetriaminepentamethylenephosphonic acid,
hexamethylenediaminetetramethylenephosphonic acid,
or a sodium or potassium salt of these acids,
as examples of phosphonate-type compounds which are advantageous for the implementation of the invention, diethylenetriaminepentamethylene-phosphonic acid (or one of its salts) being particularly preferred.

In general, the amount of deflocculating agent is of between about 0.05% and 1.5% by weight with respect to the weight of the blast furnace slag.

The anti-wringing agent which can be used in the context of the invention is advantageously a cellulosic compound such as carboxymethylcellulose, hydroxymethylcellulose, hydroxyethylcellulose, or hydroxypropylcellulose, for example.

In general, the amount of anti-wringing agent is of between about 0.02% and 0.3% by weight with respect to the weight of the blast furnace slag.

Such a concrete does not necessitate or necessitates very little additive owing to the fact that it enables the evolution of the rheology to be controlled. Moreover, it does not release, during its use, organic materials into ground waters and the pH in the immediate environment of the work made with a concrete used in the context of the invention rises much less than in the case of classical concretes, and this is beneficial for the environment. Furthermore, the content of soluble products contained in the concrete, notably of $SiO_2$ as well as of $Ca^{2+}$ and $SO_4^{2-}$ ions, is significantly reduced.

Thus, according to a second aspect, the invention relates to a concrete for foundations which is constituted by a mixture comprising (i) a blast furnace slag, (ii) an activating agent, and (iii) a deflocculating agent and/or an anti-wringing agent, these constituents being as defined above.

Obviously, this concrete also conventionally comprises aggregates which are constituted of sand and gravel or loose chippings, which represent in general about 60% to 80% by weight of the concrete composition, as well as water.

The invention will be better understood with the aid of the following examples which are given in a purely illustrative manner.

EXAMPLE 1

A concrete is prepared by mixing the following constituents:

| | |
|---|---|
| Blast furnace slag | 380 kg |
| Ca(OH)$_2$/gypsum mixture | 20 kg |
| Water | 200 l |
| Aggregates | 1,850 kg |

In this example, the slag is ground to a fineness of 3,500 Blaine. This concrete has an upkeep of its manoeuvrability of 3 hours without using additives. It does not contain any organic materials, the pH of its wringing water is limited at 11.5/11.8, and it has a Ca(OH)$_2$/CaSO$_4$ ratio of 0.5.

By comparison, a concrete made with a traditional cement will necessitate the use at least of a plasticiser and the pH of the wringing water will be situated about 12.2 with a cement of the CEM III type and 12.5/12.7 with a cement of the CEM I type.

The same concrete, prepared with a blast furnace slag having a fineness of 4,500 Blaine, has an upkeep of its manoeuvrability of about 2 hours.

EXAMPLE 2

A concrete is prepared by mixing the following constituents:

| | |
|---|---|
| Blast furnace slag | 370 kg |
| CPJ CEM II cement | 30 kg |
| Water | 200 l |
| Aggregates | 1,850 kg |
| Deflocculant | 0.8 kg |
| Anti-wringer | 0.15 kg |

In this example, the slag is ground to a fineness of 4,500 Blaine. The concrete has an upkeep of its manoeuvrability of about 5 hours, the amount of its wringing water is divided by two with respect to a classical concrete, and the pH of the wringing water is limited to 11.8. The anti-wringer used enables the amount of organic additives to be limited.

The combination of an anti-wringer and a deflocculant totally suppresses the release of organic materials into the ground waters. A classical concrete of this type would necessitate the use of a greater amount of retarding deflocculant and the impact on the environment would only be a little improved despite the use of an anti-wringer.

What is claimed is:

1. A method of making a foundation having a limited release of organic materials into the environment comprising the steps of a) excavating the ground with a drilling sludge; and b) putting concrete into the excavated ground to form a foundation having limited release of organic materials into the environment, wherein the concrete comprises (i) blast furnace slag ground to a fineness of between about 2,500 and 5,000 Blaine; (ii) an activating agent for the slag; (iii) aggregates; and (iv) water, wherein the amount of activating agent is between about 2% and 15% by weight of the weight of the blast furnace slag.

2. The method of claim 1, wherein the blast furnace slag is ground to a fineness of between about 3,500 and 4,500 Blaine.

3. The method of claim 1, wherein the blast furnace slag has a CaO/SiO$_2$ weight ratio of between about 1.10 and 1.35.

4. The method of claim 1, wherein the blast furnace slag has a chemical modulus of greater than about 500.

5. The method of claim 1, wherein said activating agent is selected from the group consisting of a lime-containing compound, a sulphate-containing compound, a mixture of a lime-containing compound and a sulphate-containing compound, and a cement.

6. The method of claim 5, wherein said activating agent is a mixture of a lime-containing compound and a sulphate-containing compound, in a weight ratio of between about 0.3 and 1.5.

7. The method of claim 5, wherein said activating agent is a cement.

8. A method of making a foundation having a limited release of organic materials into the environment comprising the steps of:

a) excavating the ground with a drilling sludge; and b) putting concrete into the excavated ground to form a foundation having limited release of organic materials into the enviroment, wherein the concrete comprises (i) blast furnace slag ground to a fineness of between about 2,500 and 5,000 Blaine; (ii) an activating agent for the slag; (iii) a compound selected from the group consisting of a deflocculating agent, an anti-wringing agent mixtures thereof; (iv) aggregates; and (v) water, wherein the amount of activating agent is between about 2% and 15% by weight of the weight of the blast furnace slag.

9. The method of claim 8, wherein the deflocculating agent is a phosphonate compound of formula (1) or (2):

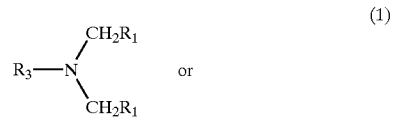

-continued $$R_5-\underset{\underset{R_6}{|}}{\overset{\overset{R_4}{|}}{C}}-\underset{\underset{OR_2}{|}}{\overset{\overset{OR_2}{|}}{P}}=O \quad (2)$$

wherein, $R_1$ represents a group of formula $$-\underset{\underset{OR_2}{|}}{\overset{\overset{OR_2}{|}}{P}}=O;$$

wherein each $R_2$ independently represents hydrogen, sodium, or potassium;

$R_3$ represents a —$CH_2R_1$, $$-(CH_2)_{\overline{n}}-N\begin{array}{c}CH_2R_1\\ \\ CH_2R_1\end{array} \quad \text{or}$$

$$-(CH_2)_{\overline{n}}-\underset{\underset{CH_2R_1}{|}}{N}-(CH_2)_{\overline{n}}-N\begin{array}{c}CH_2R_1\\ \\ CH_2R_1\end{array} \quad \text{group};$$

wherein $R_1$ is defined as above;

$R_4$, $R_5$ and $R_6$, independently of each other, represent a hydroxy, a ($C_1$–$C_4$)alkyl or an $R_1$ group; and each n is independently equal to 2, 3, 4, 5 or 6.

10. The method of claim 9, wherein the phosphonate compound is selected from the group consisting of:
hydroxyethylidene-1,1-diphosphonic acid, aminotrismethylenephosphonic acid,
ethylenediaminetetramethylenephosphonic acid, diethylenetriaminepentamethylenephosphonic acid,
hexamethylenediaminetetramethylenephosphonic acid, and
sodium or potassium salts of these acids.

11. The method of claim 8, wherein the amount of deflocculating agent is between about 0.05% and 1.5% by weight with respect to the weight of the blast furnace slag.

12. The method of claim 8, wherein the anti-wringing agent is a cellulosic compound.

13. The method of claim 12, wherein the cellulosic compound is selected from the group consisting of carboxymethylcellulose, hydroxymethylcellulose, hydroxyethylcellulose, and hydroxypropylcellulose.

14. The method of claim 8, wherein the amount of anti-wringing agent is between about 0.02% and 0.3% by weight with respect to the weight of the blast furnace slag.

15. The method of claim 8, wherein the blast furnace slag is ground to a fineness of between about 3,500 and 4,500 Blaine.

16. The method of claim 8, wherein the blast furnace slag has a CaO/$SiO_2$ weight ratio of between about 1.10 and 1.35.

17. The method of claim 8, wherein the blast furnace slag has a chemical modulus of greater than about 500.

18. The method of claim 8, wherein said activating agent is selected from the group consisting of a lime-containing compound, a sulphate-containing compound, a mixture of a lime-containing compound and a sulphate-containing compound, and a cement.

19. The method of claim 18, wherein said activating agent is a mixture of a lime-containing compound and a sulphate-containing compound, in a weight ratio of between about 0.3 and 1.5.

20. The method of claim 18, wherein said activating agent is a cement.

21. A concrete for foundations comprising (i) blast furnace slag ground to a fineness of between about 2,500 and 5,000 Blaine; (ii) about 2% to 15% by weight, based on the weight of the blast furnace slag, of an activating agent for the slag; (iii) a compound selected from the group consisting of a deflocculating agent, an anti-wringing agent and mixtures thereof, (iv) aggregates; and (v) water.

22. The concrete of claim 21, wherein the blast furnace slag is ground to a fineness of between about 3,500 and 4,500 Blaine.

23. The concrete of claim 21, wherein the blast furnace slag has a CaO/$SiO_2$ weight ratio of between about 1.10 and 1.35.

24. The concrete of claim 21, wherein the blast furnace slag has a chemical modulus of greater than about 500.

25. The concrete of claim 21, wherein the activating agent is selected from the group consisting of a lime-containing compound, a sulphate-containing compound, a mixture of a lime-containing compound and a sulphate-containing compound, and a cement.

26. The concrete of claim 25, wherein the activating agent is a mixture of a lime-containing compound and a sulphate-containing compound, in a weight ratio of between about 0.3 and 1.5.

27. The concrete of claim 25, wherein the activating agent is a cement.

28. The concrete of claim 21, wherein the deflocculating agent is a phosphonate compound of formula (1) or (2):

$$-\underset{\underset{OR_2}{|}}{\overset{\overset{OR_2}{|}}{P}}=O;$$

wherein $R_1$ represents a group of formula $$R_3-N\begin{array}{c}CH_2R_1\\ \\ CH_2R_1\end{array} \quad \text{or} \quad (1)$$

$$R_5-\underset{\underset{R_6}{|}}{\overset{\overset{R_4}{|}}{C}}-\underset{\underset{OR_2}{|}}{\overset{\overset{OR_2}{|}}{P}}=O \quad (2)$$

wherein each $R_2$ independently represents hydrogen, sodium, or potassium;

$R_3$ represents a —$CH_2R_1$, $$-(CH_2)_{\overline{n}}-N\begin{array}{c}CH_2R_1\\ \\ CH_2R_1\end{array} \quad \text{or}$$

-continued

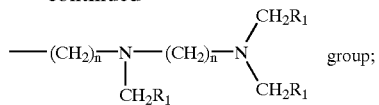

wherein $R_1$ is as defined above;
$R_4$, $R_5$ and $R_6$, independently of each other, represent a hydroxy, a $(C_1-C_4)$alkyl or an $R_1$ group; and
each n is independently equal to 2, 3, 4, 5 or 6.

29. The concrete of claim 28, wherein the phosphonate compound is selected from the group consisting of: hydroxyethylidene-1,1-diphosphonic acid, aminotrismethylenephosphonic acid, ethylenediaminetetramethylenephosphonic acid, diethylenetriaminepentamethylenephosphonic acid, hexamethylenediaminetetramethylenephosphonic acid, and sodium or potassium salts of these acids.

30. The concrete of claim 21, wherein the amount of deflocculating agent is between about 0.05% and 1.5% by weight with respect to the weight of the blast furnace slag.

31. The concrete of claim 21, wherein the anti-wringing agent is a cellulosic compound.

32. The concrete of claim 31, wherein the cellulosic compound is selected from the group consisting of carboxymethylcellulose, hydroxymethylcellulose, hydroxyethylcellulose, and hydroxypropylcellulose.

33. The concrete of claim 21, wherein the amount of anti-wringing agent is between abut 0.02% and 0.3% by weight with respect to the weight of the blast furnace slag.

* * * * *